United States Patent
Jenks et al.

(10) Patent No.: US 12,330,512 B1
(45) Date of Patent: Jun. 17, 2025

(54) SYSTEMS AND METHODS FOR MARINE VESSEL VOLTAGE DETECTION

(71) Applicant: Brunswick Corporation, Mettawa, IL (US)

(72) Inventors: Christopher R. Jenks, Rosendale, WI (US); Corey L. Bruno, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 218 days.

(21) Appl. No.: 18/046,395

(22) Filed: Oct. 13, 2022

(51) Int. Cl.
*B60L 3/00* (2019.01)
*B63H 21/17* (2006.01)

(52) U.S. Cl.
CPC ............ *B60L 3/0046* (2013.01); *B63H 21/17* (2013.01); *B60L 2200/32* (2013.01); *B60L 2240/545* (2013.01)

(58) Field of Classification Search
None
See application file for complete search history.

(56) References Cited

U.S. PATENT DOCUMENTS

| | | | | |
|---|---|---|---|---|
| 4,492,877 A * | 1/1985 | Staerzl | ................... | C23F 13/02 |
| | | | | 204/196.36 |
| 5,369,365 A | 11/1994 | Waitman | | |
| 6,559,660 B1 * | 5/2003 | Staerzl | ................. | G01R 31/008 |
| | | | | 204/196.01 |
| 6,724,589 B1 * | 4/2004 | Funderburk | ........... | G01R 31/52 |
| | | | | 361/45 |
| 7,659,699 B2 | 2/2010 | Boebel | | |
| 8,643,360 B1 | 2/2014 | Cargill, III | | |
| 8,686,713 B2 | 4/2014 | Cargill, III | | |
| 9,168,979 B1 * | 10/2015 | Schueller | ................ | B63B 59/04 |
| 9,285,396 B2 | 3/2016 | King, Jr. et al. | | |
| 9,678,119 B2 | 6/2017 | King, Jr. et al. | | |
| 9,718,526 B2 | 8/2017 | Biebach et al. | | |
| 9,789,946 B2 | 10/2017 | Biebach et al. | | |
| 9,799,193 B2 | 10/2017 | King, Jr. et al. | | |
| 9,959,734 B1 * | 5/2018 | Figura | .............. | G01R 19/16576 |
| 10,096,863 B2 | 10/2018 | Hartmeyer et al. | | |
| 10,288,662 B2 | 5/2019 | King, Jr. et al. | | |
| 10,359,453 B2 | 7/2019 | King, Jr. et al. | | |
| 10,392,095 B2 | 8/2019 | Biebach et al. | | |
| 10,529,214 B2 | 1/2020 | King, Jr. et al. | | |
| 10,647,398 B2 | 5/2020 | Biebach | | |

(Continued)

FOREIGN PATENT DOCUMENTS

JP 2012118721 6/2012

OTHER PUBLICATIONS

Mercury Marine SmartCraft VesselView Brochure, Apr. 2021.

*Primary Examiner* — Daniel L Greene
(74) *Attorney, Agent, or Firm* — Andrus Intellectual Property Law, LLP

(57) ABSTRACT

A voltage detection system for a marine vessel is provided. The system includes at least one electrode set configured to detect a voltage gradient measurement at a location in a body of water surrounding the marine vessel, and a control system. The control system is configured to receive the voltage gradient measurement from each electrode set; compare each voltage gradient measurement to at least one threshold to determine a voltage threat level, and generate a threat response based on the voltage threat level.

17 Claims, 5 Drawing Sheets

(56) References Cited

U.S. PATENT DOCUMENTS

| | | |
|---|---|---|
| 10,730,600 B2 | 8/2020 | Gonring |
| 10,996,253 B2 | 5/2021 | King, Jr. et al. |
| 11,002,770 B2 | 5/2021 | King, Jr. et al. |
| 2011/0277619 A1* | 11/2011 | Blumenthal ........ F41H 13/0018 239/289 |
| 2015/0198548 A1* | 7/2015 | Fournier .................. G01R 1/06 324/114 |
| 2018/0120360 A1 | 5/2018 | King, Jr. et al. |
| 2019/0108744 A1* | 4/2019 | King, Jr. ............ G01R 29/0857 |
| 2019/0284774 A1* | 9/2019 | Thompson, Jr. ....... G08B 25/00 |
| 2020/0126390 A1 | 4/2020 | King, Jr. et al. |
| 2020/0335833 A1* | 10/2020 | Schmidt ................ H01M 10/48 |
| 2022/0200070 A1 | 6/2022 | Gonring |
| 2022/0242538 A1 | 8/2022 | Gonring |

\* cited by examiner

SYSTEMS AND METHODS FOR MARINE VESSEL VOLTAGE DETECTION

FIELD

The present disclosure relates to safety systems for marine vessels and more particularly to a stray voltage detection system that is integrated within a marine vessel.

BACKGROUND

The Background is provided to introduce a foundation and selection of concepts that are further described below in the Detailed Description. The Background is not intended to identify key or essential features of the claimed subject matter, nor is it intended to be used as an aid in limiting the scope of the claimed subject matter.

U.S. Patent Publication No. 2022/0200070 is directed to a marine battery system configured to provide energy to a marine vehicle load. The marine battery system includes a battery, an enclosure configured to at least partially encapsulate the battery, a temperature sensor configured to detect temperature information within the enclosure, a pressure sensor configured to detect pressure information within the enclosure, and a controller coupled to the temperature sensor and the pressure sensor. The controller is configured to receive the temperature information from the temperature sensor, receive the pressure information from the pressure sensor, determine whether an enclosure breach condition has occurred based on a comparison of the temperature information and the pressure information, and in response to a determination that the enclosure breach condition has occurred, perform an enclosure breach mitigation action.

U.S. Patent Publication No. 2022/0242538 is directed to a power storage system for a marine vehicle. The power storage system includes marine battery systems configured to provide energy to a marine vehicle load. Each marine battery system includes a battery and a three-position contactor configured to operate the marine battery system in one of a connected state, a disconnected state, or a bypass state. The power storage system further includes a controller coupled to each of the marine battery systems. The controller is configured to retrieve a preferred fault action for the marine battery systems, and in response to detection of a fault condition in the marine vehicle, control at least one three-position contactor of the marine battery systems according to the preferred fault action. The preferred fault action includes operating the marine battery system in the disconnected state or operating the marine battery system in the bypass state.

Each of the above patent publications is hereby incorporated herein by reference in its entirety.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a voltage detection system for a marine vessel is provided. The system includes at least one electrode set configured to detect a voltage gradient measurement at a location in a body of water surrounding the marine vessel, and a control system. The control system is configured to receive the voltage gradient measurement from each electrode set; compare each voltage gradient measurement to at least one threshold to determine a voltage threat level, and generate a threat response based on the voltage threat level.

According to another example of the present disclosure, a method for detecting voltage hazards around a marine vessel is provided. The method includes receiving a voltage gradient measurement from each of a plurality of electrode sets arranged at disparate locations on the marine vessel, comparing each voltage gradient measurement to at least one threshold to determine a voltage threat level, and generating a threat response based on the voltage threat level.

BRIEF DESCRIPTION OF THE DRAWINGS

The present disclosure is described with reference to the following Figures.

DETAILED DESCRIPTION

Figure 1:
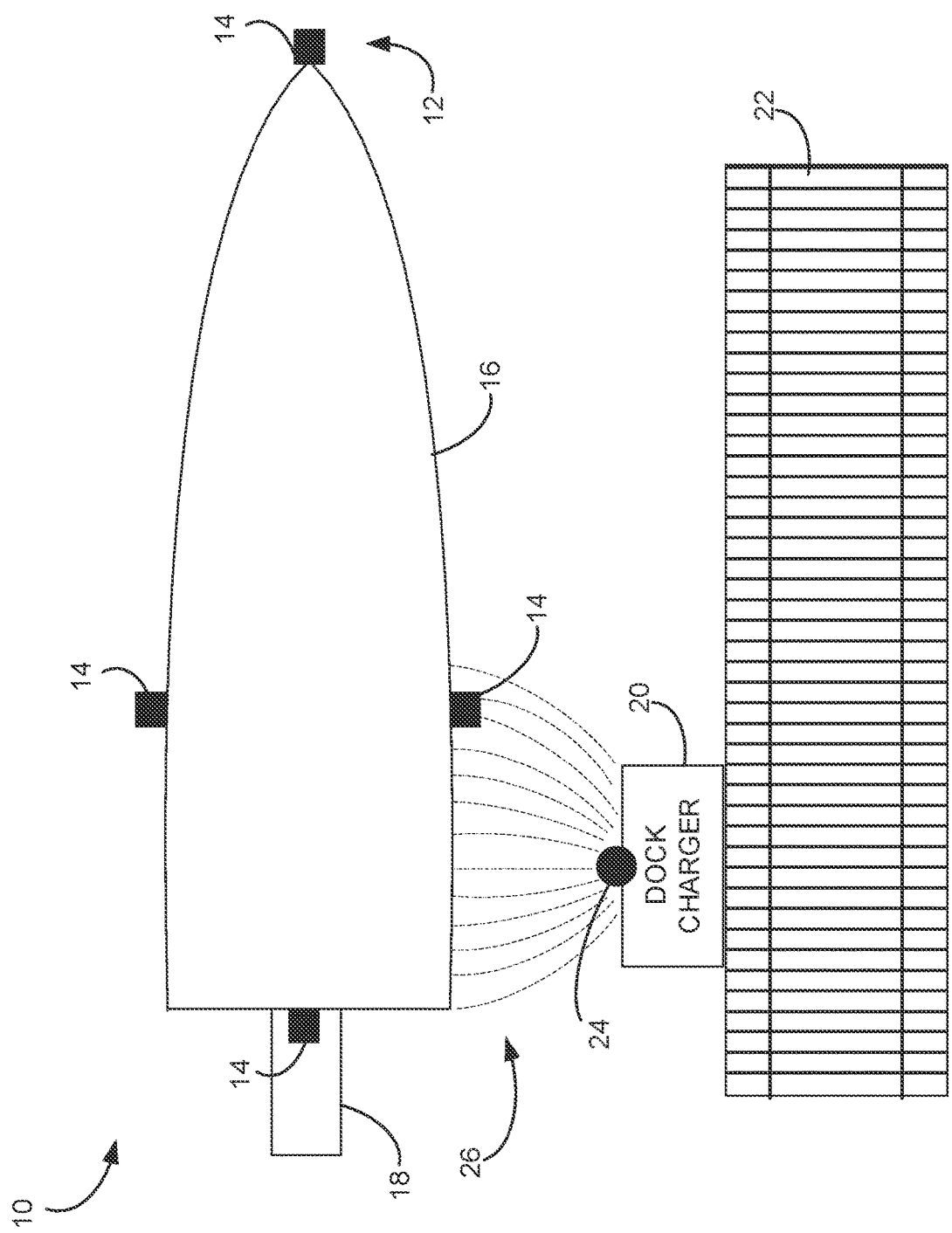
FIG. 1 is a block diagram illustrating a marine vessel including a stray voltage detection system according to an exemplary embodiment of the present disclosure.

In the present description, certain terms have been used for brevity, clearness and understanding. No unnecessary limitations are to be inferred therefrom beyond the requirement of the prior art because such terms are used for descriptive purposes only and are intended to be broadly construed.

Although the electrification of marine vessel propulsion presents numerous advantages over traditional internal combustion engines, it also poses some novel challenges, including the risk of electric shock. Malfunctions of electric marine drives (e.g., outboard motors) and their associated charging infrastructure (e.g., dock chargers) can result in stray voltage fields entering bodies of water adjacent the electric marine drives and charging infrastructure. For example, a faulted electric outboard motor may become a positive electric pole in the body of water, with the hull of the marine vessel, fabricated from carbon fiber or aluminum, acting as the negative electric pole, resulting in a potentially dangerous voltage gradient extending between the positive and negative poles.

Such voltage fields can pose a risk of electrocution to the operators and occupants of marine vessels, as well as bystanders in and around the water. The risk of electrocution to swimmers is particularly acute because skin conductivity drops from $100,000\Omega$ when dry to $300\Omega$ when wet. Although the risk of electrocution is lower in saltwater, as saltwater is significantly more conductive than freshwater and thus tends to shunt electricity around the body rather than through it, the risk is not entirely eliminated, and many marine vessels are operated in freshwater, meaning that the risk of shock is present in all operating scenarios. Humans have no innate ability to detect voltage fields until suffering the effects of electric shock, which can include muscle contraction, loss of muscle control, stimulation of the heart causing fibrillation, and death. If the voltage field is not sufficiently powerful to immediately cause death, muscle contraction and loss of muscle control can prevent the swimmer from swimming away from the voltage field, which can likewise result in death due to electric shock drowning (ESD). The lack of an ability to innately detect voltage fields can also put would-be rescuers at significant risk of injury or death if the rescuers do not recognize that a swimmer in distress may be due to an electric field, potentially compounding an already tragic situation.

Existing systems to detect stray voltage fields in bodies of water are packaged as freestanding sensor units that are not integrated with marine vessel systems. Such existing systems are therefore not optimally configured to detect voltage fields in critical areas around the marine vessel (e.g., swim platforms, electric propulsion systems, vessel hulls). Nor are existing systems optimally configured to generate on-vessel warnings and proactively shut down and/or disconnect high voltage components to protect occupants of a marine vessel and swimmers near the marine vessel. For all of these reasons, the present inventors have recognized that a stray voltage detection system that is fully integrated with a marine vessel would be useful.

Figure 2:
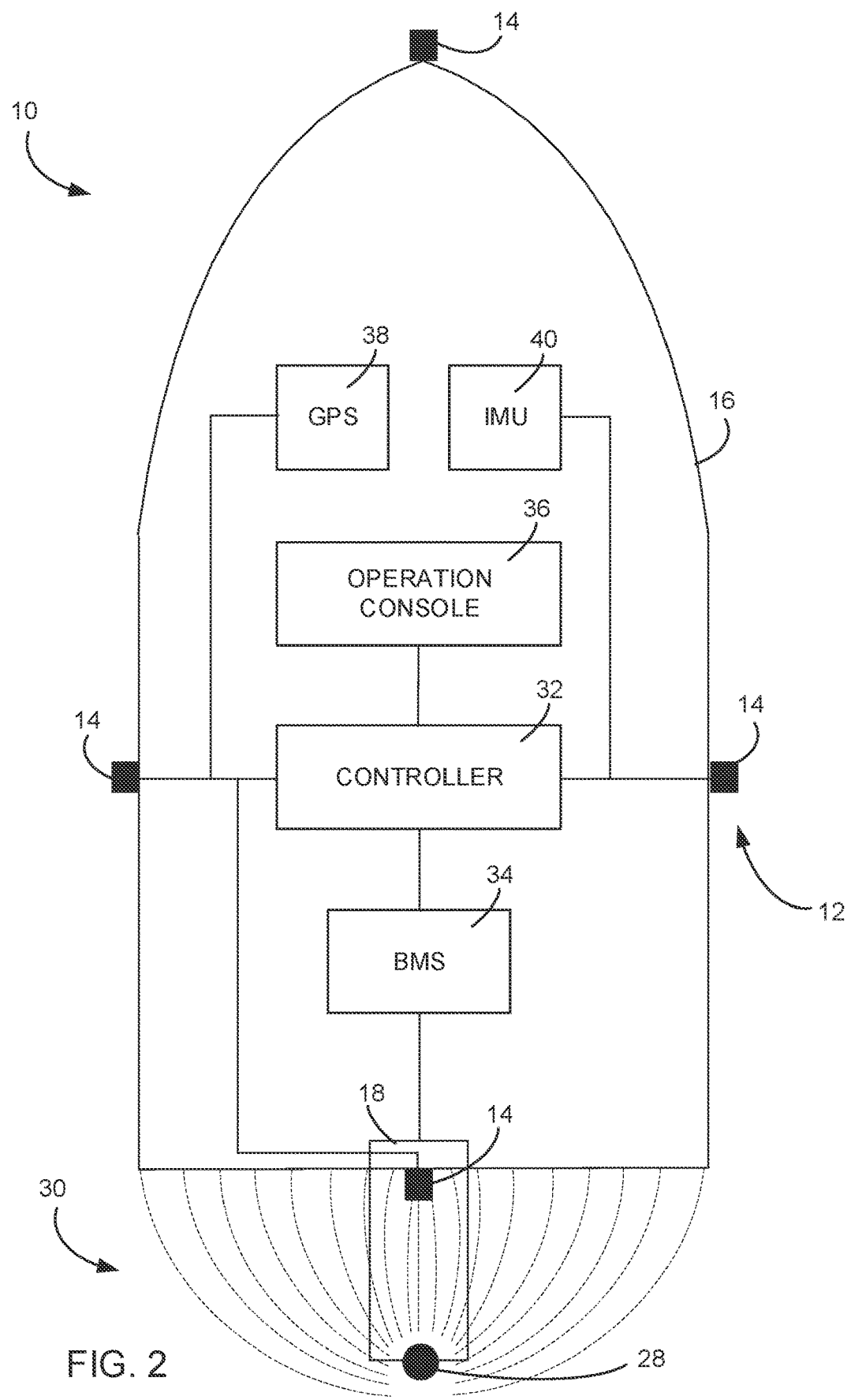
FIG. 2 is another block diagram illustrating the system of FIG. 1.

FIGS. 1 and 2 depict block diagrams of a marine vessel 10 with an integrated stray voltage detection system 12. The system 12 includes multiple electrode sets 14 that are coupled to the hull 16 of the marine vessel 10 and configured to measure a voltage gradient, although in other embodiments, the system 12 may include a single electrode set 14 based on the intended operation of and potential risks to the marine vessel 10. As shown in FIGS. 1 and 2, in an exemplary implementation, the system 12 includes a set 14 positioned at the bow of the hull 16, a set 14 positioned on the port side of the hull 16, a set 14 positioned on the starboard side of the hull 16, and a set 14 positioned on a propulsion device 18 (e.g., an electric outboard motor, see FIG. 3) at the stern of the hull 16. The concepts described herein are not limited for use with outboard motors, and the propulsion device could be a stern drive, a pod drive, an inboard/outboard drive, and/or the like.

The particular characteristics of the electrode sets 14 are not particularly limited. In an exemplary implementation, each of the electrode sets 14 includes at three individual sensing electrodes arranged in a triangular shape. At least three electrodes are preferred because two electrodes could be positioned along a field line in an electric field, and thus could fail to detect a voltage gradient. The voltage gradient (i.e., volts per centimeter) measured by each electrode set 14 may be based on a measured voltage difference between any of the three electrodes in the set or may be computed based on an average of the measured voltage difference between the three electrodes. In further embodiments, the electrode sets 14 could include four or more individual sensing electrodes. In still further embodiments, the system 12 may include a different number or distribution of electrode sets 14 (e.g., two or more sets 14 positioned on the port or starboard side of the hull 16).

In the scenario depicted in FIG. 1, a voltage field 26 emanating from positive pole 24 is created due to a malfunction in a dock charger or shore power unit 20 that is coupled to a dock 22. In the scenario depicted in FIG. 2, a voltage field 30 emanating from positive pole 28 is created due to a malfunction in an electric marine drive 18 that is powered by a battery providing DC voltage. As described above, the hull 16 may be fabricated from an electrically conductive material (e.g., carbon fiber, aluminum) and/or may include metal cable pass throughs that conduct electricity and permit the hull 16 to function as a negative pole such that fields 26, 30 extend between the positive poles 24, 28 and the hull 16. Note that the field lines of the electric fields 26, 30 depicted in FIGS. 1 and 2 are representative of only a portion of the entire electric fields that would be generated in such scenarios. Other such field-generating scenarios could include any situation in which faults occur in dock power connections or electric equipment (e.g., boat lifts) located in water, or when faults occur in onboard connections between a battery and a propulsor.

As specifically depicted in FIG. 2, the marine vessel 10 is further shown to include a controller 32, a battery management system (BMS) 34, an operation console 36, a global positioning system (GPS) 38, and an inertial measurement unit (IMU) 40. The controller 32 is programmable and includes a processing system and a storage system, as is conventional. The controller 32 can be located anywhere on the vessel 10 and/or located remote from the vessel 10 via a peripheral interface and wired and/or wireless links, as will be explained further herein below. Although FIG. 2 shows one controller 32, the vessel 10 can include more than one controller. Portions of the method disclosed herein below can be carried out by a single controller or by several separate controllers. For example, the system can have a controller located at or near a helm of the vessel 10 and can also have controllers located at or near the propulsion device 18. If more than one controller is provided, each can control operation of a specific device or sub-system on the vessel 10.

In some examples, the controller 32 may include a computing system that includes the processing system, storage system, software, and input/output (I/O) interfaces for communicating with peripheral devices. The systems may be implemented in hardware and/or software that carries out a programmed set of instructions. The computing system may include one or more processors, which can be communicatively connected. The processing system can include a microprocessor, including a control unit and a processing unit, and other circuitry, such as semiconductor hardware logic, that retrieves and executes software from the storage system. The processing system can be implemented within a single processing device, but can also be distributed across multiple processing devices or sub-systems that cooperate according to existing program instructions. The processing system can include one or many software modules comprising sets of computer-executable instructions for carrying out various functions as described herein.

As used herein, the term "controller" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A controller may include memory (shared, dedicated, or group) that stores code executed by the processing system. The term "code" may include software, firmware, and/or microcode, and may refer to programs, routines, functions, classes, and/or objects. The term "shared" means that some or all code from multiple modules may be executed using a single (shared) processor. In addition, some or all code from multiple control modules may be stored by a single (shared) memory. The term "group" means that some or all code from a single controller may be executed using a group of processors. In addition, some or all code from a single controller may be stored using a group of memories.

The storage system of the controller 32 can comprise any storage media readable by the processing system and capable of storing software. The storage system can include volatile and non-volatile, removable and non-removable media implemented in any method or technology for storage of information, such as computer-readable instructions, data structures, software modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The controller 32 communicates with one or more components of the vessel 10 (e.g., electrode sets 14, BMS 34, operation console 36, GPS 38, IMU 40) via I/O interfaces and a communication link, which can be a wired or wireless link. In one example, the communication link is a controller area network (CAN) bus, as described in U.S. Pat. No. 6,273,771, incorporated by reference herein, although other types of links could be used.

The BMS 34 is configured to monitor and/or control aspects of a power storage system (e.g., battery 302, see FIG. 3 below) for the propulsion device 18. The BMS 34 may further be configured to receive information from current, voltage, and/or other sensors within the power storage system to receive information about the voltage, current, and temperature of each battery cell or group of battery cells within each battery. Voltage sensors may be configured to sense voltage within the battery (such as cell voltage sensors configured to sense the voltage of individual cells or groups of cells in an LI battery) and one or more temperature sensors may be configured to sense a temperature within a housing of the battery or a housing where one or more batteries or other storage elements are located. The BMS 34 or another controller in the system is further configured to calculate a charge level, such as a state of charge (SOC) of each battery.

The controller 32 is also shown to be communicatively coupled to an operation console 36 that may include a multifunction display (MFD) user interface device with a touchscreen that allows an operator of the marine vessel 10 to operate the vessel in one or more operating modes. In various embodiments, the operation console 36 may be for example, part of an onboard management system, such as the VesselView™ by Mercury Marine of Fond du Lac, Wisconsin. The GPS 38 provides the location (latitude and longitude), speed (speed over ground), and direction (course over ground) of the marine vessel 10. The IMU 40 may have a solid state, rate gyro electronic compass that detects the direction of the earth's magnetic field using solid state magnetometers and indicates the vessel heading relative to magnetic north. Additionally, solid state accelerometers and angular rate sensors in the IMU may be provided to sense the vessel's attitude and rate of turn. As described in further detail below, the GPS 38 and the IMU 40 may be utilized to determine a status of the vessel 10 when a voltage gradient is measured by one of the electrode sets 14 and ensure a correct threat level response is performed.

Figure 3:
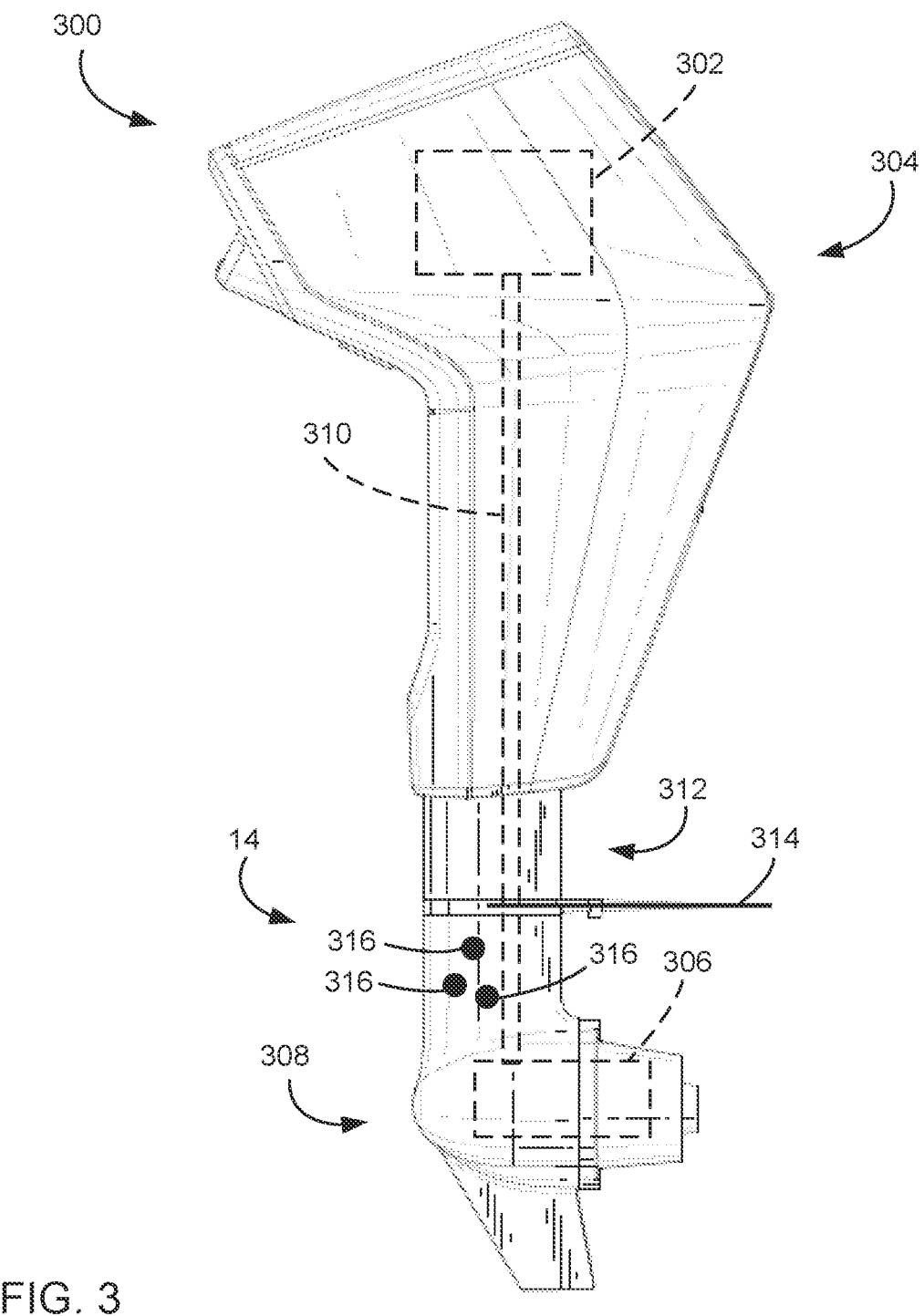
FIG. 3 is a side view of an outboard motor with an integrated electrode set that can be used in the system of FIG. 1.

FIG. 3 illustrates an electric drive 300 with an integrated electrode set 14. In an exemplary implementation, the electric drive 300 may be utilized as the propulsion device 18 for the vessel depicted in FIGS. 1 and 2. The electric drive includes a battery 302 located within cowling 304 which provides battery power to an electric motor 306 located in a lower unit 308 for powering a propulsor. The battery 302 and the electric motor 306 are electrically connected via electrical wires 310 extending into the lower unit 308 via an extension leg 312, and the battery 302 may be controlled by the BMS 34 (see FIG. 2). In an exemplary embodiment, the battery 302 may be a rechargeable battery, for example, a lithium battery.

An anti-cavitation plate 314 is further shown to be coupled to the extension leg 312. The integrated electrode set 14 with three individual electrodes 316 is shown to be located below the anti-cavitation plate 314. As described above, in an exemplary embodiment, the electrodes 316 are optimally mounted in a triangular configuration, with at least 50 mm of clearance between each of the electrodes 316. In general, a greater amount of spacing between the electrodes 316 is preferred, and in some embodiments, it may be optimal to mount electrodes 316 on both the hull 16 and the drive 300 to detect voltage gradients behind the hull 16 and in the area surrounding the drive 300.

Figure 4:
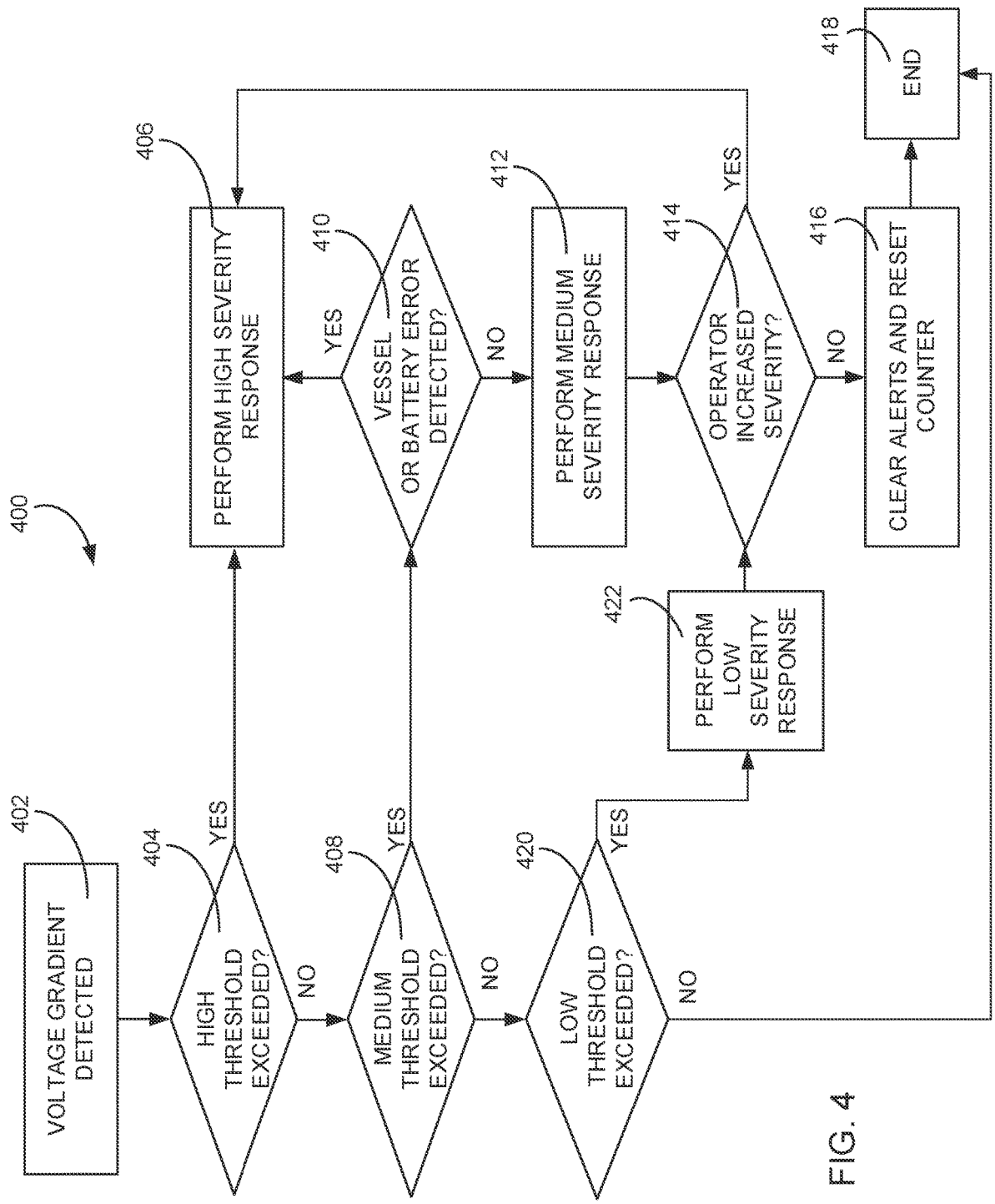
FIG. 4 is a flow chart of a process for operating the stray voltage detection system of FIG. 1.

Turning now to FIG. 4, a flow chart of a process 400 for operating the stray voltage detection system 12 on the marine vessel 10 is provided. In an exemplary implementation, process 400 may be performed primarily by controller 32 (see FIG. 2). Process 400 is initiated at step 402, as a voltage gradient is detected in the body of water in which the marine vessel 10 is situated. Detection may occur when at least one of the electrode sets 14 returns a non-zero voltage measurement to the controller 32.

At step 404, the controller 32 determines if the detected voltage gradient exceeds a high threshold. The high threshold (e.g., 0.26 V/cm for a DC voltage source, 0.16 V/cm for an AC voltage source, Note: AC voltage sources are more dangerous due to the cycling voltages) may be stored in the storage system of the controller 32 and corresponds to an exceedingly high risk of death or serious injury from electric shock. Accordingly, if a voltage gradient exceeding a high threshold is detected, process 400 advances to step 406 and the controller 32 commands various components of the marine vessel 10 to perform a high severity threat level response. In various implementations, the high severity threat level response may include any or all of the following: disconnecting a battery from an electric drive propulsion device (including igniting a pyro fuse that will fully disable the battery until serviced), activating an audible alert (e.g., a warning horn), activating a visual alert (e.g., a warning light), documenting a fault in a fault log, and generating a high severity alert message to be displayed on a user interface device (e.g., an MFD of the operation console 36, a smartphone or tablet of the marine vessel operator/occupants). In an exemplary implementation, the specific actions commanded by the controller 32 may be configurable by an operator using a user interface device of the operation console 36. In some embodiments, the alert message displayed on the user interface device also includes a display of the vessel 10 and the body of water surrounding the vessel, with hazard regions annotated on the display where voltage gradients have been measured by the electrode sets 14. In still further embodiments, such a display may include instructions for swimmers to safely exit a field by swimming parallel to the field lines, rather than across them, which can result in electric shock.

Returning to step 404, if the high voltage gradient threshold is not exceeded, process 400 advances to step 408, in which the controller 32 determines whether the detected voltage differential exceeds a medium voltage differential threshold (e.g., 0.13 V/cm for a DC voltage source). If a voltage gradient exceeding a medium threshold is detected, process 400 advances to step 410 and the controller 32 checks various systems of the marine vessel 10 to determine if a battery or vessel fault has been detected to warrant escalation to the high severity threat level response of step 406. For example, step 410 may include checking, based on inputs from the BMS 34, whether a SOC of the battery 302 is at an expected level or if it has discharged unexpectedly. As another example, step 410 could include determining, based on inputs from the GPS 38 and IMU 40 as well as temperature sensor inputs to the BMS 34, that the vessel 10 has capsized or is otherwise taking on water, thus warranting escalation to the high severity threat level response of step 406 and disconnection of high voltage components, even if performing such a response would disable the vessel 10.

If the controller 32 determines that no vessel or battery error is present warranting escalation of the threat level at step 410, the controller commands various components of the marine vessel 10 to perform a medium severity threat level response. In various implementations, the medium severity threat level response may include any or all of the following: activating an audible alert (e.g., a warning horn), activating a visual alert (e.g., a warning light), documenting a fault in a fault log, and generating a medium severity alert message to be displayed on a user interface device. Process 400 then advances to step 414 to determine if an operator has manually increased the severity of the threat level response. For example, the alert message displayed as part of step 412 may include a prompt to the operator to increase the threat level response, if desired. If the operator has manually increased the severity of the threat level response, process 400 reverts to step 406, as described above.

If the operator does not manually increase the severity of the threat level response at step 414, process 400 advances to step 416 as the controller 32 stops the performance of the threat level response (e.g., by clearing alerts displayed on a user interface device, arresting the audible and/or visual alert) and resets an alarm counter that may be stored in the storage device of the controller 32. Alarms may be tracked and stored for a variety of purposes, for example, troubleshooting: if a fault is repetitive, it may be indicative of a problem that must be addressed rather than a single or intermittent failure. Tracking alarms may also permits identification of the source of an error. For example, if a repetitive voltage gradient is detected independent of vessel location, such an error would be indicative of an on-board vessel fault, as opposed to a dock-based fault. Process 400 then concludes at step 418.

Returning to step 408, if the medium voltage threshold is not exceeded, process 400 advances to step 420, in which the controller 32 determines whether the detected voltage differential exceeds a low voltage differential threshold (e.g., 0.06 V/cm for a DC voltage source, 0.016 V/cm for an AC voltage source) . . . . If the low voltage gradient threshold is exceeded, process 400 advances to step 422, in which the controller 32 commands various components of the marine vessel 10 to perform a low severity threat level response. In various implementations, the low severity threat level response may include activating a visual alert (e.g., a warning light), documenting a fault in a fault log, and generating a low severity alert message to be displayed on a user interface device. After performing the low severity threat level response, process 400 advances to step 414 as described above, in which the operator has the option to manually increase the severity of the threat level response. If the operator does increase the severity of the response, process 400 concludes at step 406. If the operator does not increase the severity of the response, process 400 advances to step 416 by stopping performance of the low severity threat level response, and process 400 concludes at step 418.

Figure 5:
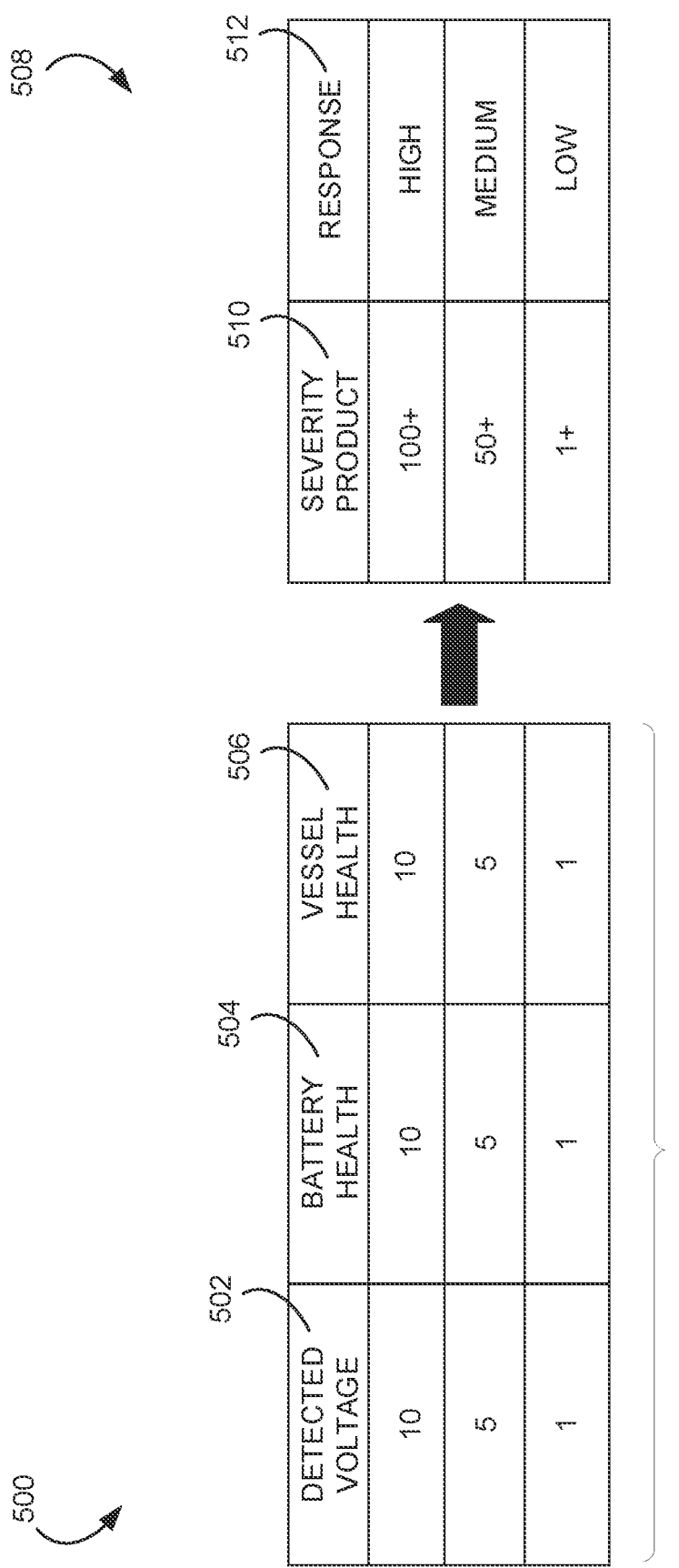
FIG. 5 are tables illustrating a failure mode and effects analysis process for operating the stray voltage detection system of FIG. 1.

Referring now to FIG. 5, another process for operating the stray voltage detection system 12 and responding to detected voltage gradients is depicted. Specifically, FIG. 5 depicts a failure mode and effects analysis process in which the severity level of three different parameters depicted in table 500 (i.e., detected voltage 502, battery health 504, and vessel health 506) is assigned based on stored values in the controller 32 in the event of a voltage gradient detected by one or more of the electrode sets 14. The detected voltage parameter 502 may be assigned a severity level (e.g., 10, 5, or 1, although such values could be adjusted according to operator preference) according to the magnitude of the detected voltage gradient (e.g., exceeding a high threshold, a medium threshold, or a low threshold). The battery health parameter 504 may be assigned a severity level according to inputs received from the BMS 34. Such inputs may include, but are not limited to, the actual SOC of the battery as compared with an expected value and a temperature of the battery. The vessel health parameter 506 may be assigned a severity level according to inputs from a variety of sources, including, but not limited to a vessel electrical system, a vessel orientation sensor, a vessel motion sensor, a global positioning system, and a passenger location monitoring system. For example, the vessel health parameter 506 may assign a high severity level (e.g., 10) if a passenger location monitoring system indicates that a vessel passenger is swimming in the body of water surrounding the marine vessel 10 and is thus at far greater risk of electric shock than passengers located onboard the marine vessel 10.

After multiplying the severity levels of the detected voltage parameter 502, the battery health parameter 504, and the vessel health parameter 506, the appropriate action is taken by the controller 32 according to the response table 508. For example, if the product of parameters 502-506 is greater than 100 per the severity product column 510, the controller 32 may perform a high threat level response per response column 512. In an exemplary embodiment, the high threat level response is identical or substantially similar to the high severity response described above with reference to step 406 of process 400. Likewise, if the severity product is between 50 and 99, or less than 50, the controller 32 may perform medium or low threat level responses as described above with reference to steps 412 and 422 of process 400, respectively.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A voltage detection system for a marine vessel, the system comprising:
  at least one electrode set configured to detect a voltage gradient measurement at a location in a body of water surrounding the marine vessel; and a control system configured to:
receive the voltage gradient measurement from each electrode set;
compare each voltage gradient measurement to at least one threshold to determine a voltage threat level; and
generate a threat response on the marine vessel based on the voltage threat level and at least one of a battery health level and a vessel health level, wherein the battery health level is determined using at least one of a battery state of charge or a battery temperature from a battery management system and the vessel health level is determined using vessel input from at least one of a voltage sensor in a vessel electrical system, a vessel orientation sensor, a vessel motion sensor, a global positioning system, and a passenger location monitoring system.

2. The voltage detection system of claim 1, wherein the at least one electrode set comprises a plurality of electrode sets arranged at disparate locations on the marine vessel.

3. The voltage detection system of claim 2, wherein the disparate locations on the marine vessel comprise at least three of the following: a bow region of the marine vessel, a stern region of the marine vessel, a port side of the marine vessel, a starboard side of the marine vessel, and mounted on a marine drive configured to propel the marine vessel.

4. The voltage detection system of claim 1, wherein the at least one electrode set is mounted on a marine drive configured to propel the marine vessel.

5. The voltage detection system of claim 4, wherein the at least one electrode set is mounted below an anti-cavitation plate coupled to an extension leg of the marine drive.

6. The voltage detection system of claim 1, wherein each electrode set comprises at least three electrodes.

7. The voltage detection system of claim 1, wherein the at least one threshold comprises a high threshold, a medium threshold, and a low threshold.

8. The voltage detection system of claim 7, wherein the high threshold is a lethal threshold.

9. The voltage detection system of claim 1, wherein the threat response comprises selecting at least one of activating a warning horn, activating a warning light, and generating an alert for a display device.

10. The voltage detection system of claim 9, wherein generating an alert for a display device comprises identifying at least one hazard region in a body of water proximate the marine vessel.

11. The voltage detection system of claim 1, wherein the threat response comprises commanding a battery management system to disconnect a battery.

12. The voltage detection system of claim 1, wherein the control system is further configured to document the threat response in a fault log based on the voltage threat level.

13. A method for detecting voltage hazards around a marine vessel, the method comprising:
receiving a voltage gradient measurement from each of a plurality of electrode sets arranged at disparate locations on the marine vessel;
comparing each voltage gradient measurement to at least one threshold to determine a voltage threat level; and
generating a threat response on the marine vessel based on the voltage threat level and at least at least one of a battery health level and a vessel health level, wherein the battery health level is determined using at least one of a battery state of charge or a battery temperature from a battery management system and the vessel health level is determined using vessel input from at least one of a voltage sensor in a vessel electrical system, a vessel orientation sensor, a vessel motion sensor, a global positioning system, and a passenger location monitoring system.

14. The method of claim 13, wherein the at least one threshold comprises a high threshold, a medium threshold, and a low threshold.

15. The method of claim 13, wherein the threat response comprises selecting at least one of activating a warning horn, activating a warning light, and generating an alert for a display device.

16. The method of claim 15, wherein generating an alert for a display device comprises identifying at least one hazard region in a body of water proximate the marine vessel.

17. The method of claim 13, wherein the threat response comprises commanding a battery management system to disconnect a battery.

\* \* \* \* \*